United States Patent
Grossberger (10) Patent No.: US 8,336,893 B2
(45) Date of Patent: Dec. 25, 2012

(54) STRAWBERRY PICKING CART

(76) Inventor: Dario Grossberger, Camarillo, CA (US)

(*) Notice: Subject to any disclaimer, the term of this patent is extended or adjusted under 35 U.S.C. 154(b) by 167 days.

(21) Appl. No.: 12/980,443

(22) Filed: Dec. 29, 2010

(65) Prior Publication Data

US 2012/0169019 A1  Jul. 5, 2012

(51) Int. Cl.
*A01D 67/04* (2006.01)
(52) U.S. Cl. ................................ 280/32.5; 280/242.1
(58) Field of Classification Search .............. 280/32.5, 280/242.1; 414/528, 527; 56/328.1, 327.1
See application file for complete search history.

(56) References Cited

U.S. PATENT DOCUMENTS

| | | | |
|---|---|---|---|
| 2,825,273 A * | 3/1958 | Faucheux | 172/28 |
| 3,037,570 A * | 6/1962 | Olson | 280/32.5 |
| 3,361,224 A * | 1/1968 | McKim | 280/32.5 |
| 3,389,542 A | 6/1968 | Rasmussen | |
| 3,460,332 A | 8/1969 | Buchele et al. | |
| 3,521,438 A | 7/1970 | Adrian | |
| 3,552,108 A | 1/1971 | Kattan et al. | |
| 3,596,456 A | 8/1971 | Quick | |
| 3,623,309 A | 11/1971 | Stang et al. | |
| 3,736,738 A | 6/1973 | Carr | |
| 4,519,191 A | 5/1985 | Ledebuhr et al. | |
| 4,524,573 A | 6/1985 | Kinney | |
| 4,526,248 A * | 7/1985 | Johansen | 280/32.5 |
| 5,024,052 A | 6/1991 | Bragg et al. | |
| 5,322,409 A * | 6/1994 | McCluney | 280/32.5 |
| 6,286,407 B2 | 9/2001 | Ortega et al. | |
| 6,550,366 B2 | 4/2003 | Ortega et al. | |
| 6,758,317 B1 | 7/2004 | Colby | |
| 6,981,357 B2 | 1/2006 | Colby | |

* cited by examiner

*Primary Examiner* — Hau Phan
(74) *Attorney, Agent, or Firm* — DLC Patents, PLLC; Dustin L. Call (57) ABSTRACT

One example embodiment includes a system for stacking boxes in a strawberry picking cart. The system includes spring-loaded hooks, where the spring-loaded hook is configured to support a stack of full strawberry boxes, and a platform, where the platform is configured to support a bottom strawberry box. The system also includes a lifting mechanism. The lifting mechanism is configured to lift the platform such that the bottom strawberry box is positioned below the stack of full strawberry boxes. The lifting mechanism is also configured to remove the spring-loaded hook from the stack of full strawberry boxes. The lifting mechanism is further configured to raise the bottom strawberry box until the spring-loaded hook supports the bottom strawberry box.

10 Claims, 11 Drawing Sheets

STRAWBERRY PICKING CART

CROSS-REFERENCE TO RELATED APPLICATIONS

Not applicable.

BACKGROUND OF THE INVENTION

Picking strawberries can be a difficult and arduous task. Most of the time, picking is done by hand by workers on foot. The workers pick the strawberries and place them in boxes of standardized size so the boxes can be stacked on top of one another. The workers get an empty box from the end of the field row or other collection point, walk it to where they need to pick, fill the box, and then return it to the collection point. Consequently, the worker spends a significant portion of his/her time moving boxes back and forth; time which cannot be spent picking strawberries.

In addition, the worker has to bend over to pick the strawberries. I.e., because strawberries grow low to the ground, the worker has to either squat down or bend over when picking the strawberries. This can lead to knee and/or back problems for the worker. Thus, time is lost allowing workers to recover from this strain and workers can suffer serious knee and back problems over time.

Strawberry picking carts have been conceived but they are neither widely used nor widely available. This is because the strawberry picking carts have a number of drawbacks. In particular, they provide a space for the worker, but they do not increase the worker's efficiency. No provision is made for collection of filled boxes or distribution to the worker of unfilled boxes. When a box is filled, a worker must still take the box to the end of the row and retrieve an empty box which can likewise be filled. Therefore, the amount of time moving boxes to and from collection points is not reduced.

The workers could use existing wheeled devices, such as wheelbarrows, garden cars, works trucks and the like, to assist in the strawberry picking. However, these devices suffer a number of drawbacks. In particular, they are not sized to work well in strawberry fields. In particular, strawberry fields include wide rows. These devices would therefore have to be driven directly over the strawberry plants and damage the plants and fruit. Further, they do not allow the worker to pick strawberries in a more comfortable position and do not reduce the amount of strain to the user's joints. Further, these devices cannot hold enough filled boxes to save the worker from taking filled boxes to collection points while working a row. I.e., when the box is full, a worker must move the box to the end of the row and retrieve an empty box which can likewise be filled. Therefore, the amount of time moving boxes to and from collection points is not reduced.

Additionally, automated means for picking strawberries exist; however, they are not widely available. In particular, the automated means generally damage the strawberries, are inefficient, or are too expensive. Therefore, automated means of harvesting strawberries are not widely used.

Accordingly, there is a need in the art for a strawberry picking strawberry picking cart that can be moved by the user while in position to harvest the strawberries. In addition, there is a need in the art for the strawberry picking cart to allow the user to quickly store full strawberry boxes and place an empty strawberry box in position for picking. Further, there is a need in the art for a strawberry picking cart that can reduce the number of trips to collection points. Additionally, there is a need in the art for a strawberry picking cart that allows the user to keep his/her hands free while picking strawberries.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a system for stacking boxes in a strawberry picking cart. The system includes spring-loaded hooks, where the spring-loaded hook is configured to support a stack of full strawberry boxes, and a platform, where the platform is configured to support a bottom strawberry box. The system also includes a lifting mechanism. The lifting mechanism is configured to lift the platform such that the bottom strawberry box is positioned below the stack of full strawberry boxes. The lifting mechanism is also configured to remove the spring-loaded hook from the stack of full strawberry boxes. The lifting mechanism is further configured to raise the bottom strawberry box until the spring-loaded hook supports the bottom strawberry box.

Another example embodiment includes a system for gathering strawberries. The system includes a strawberry picking cart. The strawberry picking cart includes a cushion, where the cushion is configured to allow the user to lie in a prone position, and one or more wheels, where the one or more wheels are configured to support the weight of the strawberry picking cart. The system also includes a steering mechanism with passive alignment to maintain the wheels of the cart within the field furrows and a stacking mechanism. The stacking mechanism includes a spring-loaded hook, where the spring-loaded hook is configured to support a stack of full strawberry boxes, and a platform, where the platform is configured to support a bottom strawberry box. The stacking mechanism also includes a lifting mechanism. The lifting mechanism is configured to lift the platform such that the bottom strawberry box is positioned below the stack of full strawberry boxes. The lifting mechanism is also configured to remove the spring-loaded hook from the stack of full strawberry boxes. The lifting mechanism is further configured to raise the bottom strawberry box until the spring-loaded hook supports the bottom strawberry box.

Another example embodiment includes a system for gathering strawberries. The system includes a strawberry picking cart. The strawberry picking cart includes a cushion, where the cushion is configured to allow the user to lie in a prone position, and two front wheels, wherein each front wheel is connected to an axle on the strawberry picking cart. The strawberry picking cart also includes two rear wheels, wherein each rear wheel is connected to an axle on the strawberry picking cart, where the front wheel axles and the rear wheel axles are configured to support the weight of the strawberry picking cart. The strawberry picking cart further includes one or more pedals, wherein the user is able to use the one or more pedals to rotate the rear wheels. The system also includes a movable platform, where the movable platform is configured to support a strawberry box, and a stacking mechanism. The stacking mechanism includes a spring-loaded hook, where the spring-loaded hook is configured to support a stack of full strawberry boxes, and a platform, where the platform is configured to support a bottom strawberry box. The stacking mechanism also includes a lifting mechanism. The lifting mechanism is configured to lift the platform such that the bottom strawberry box is positioned below the stack of full strawberry boxes. The lifting mechanism is also configured to move the spring-loaded hook from under the stack of full strawberry boxes. The lifting mechanism is further configured to raise the bottom strawberry box until the spring-loaded hook supports the bottom strawberry box.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1A:
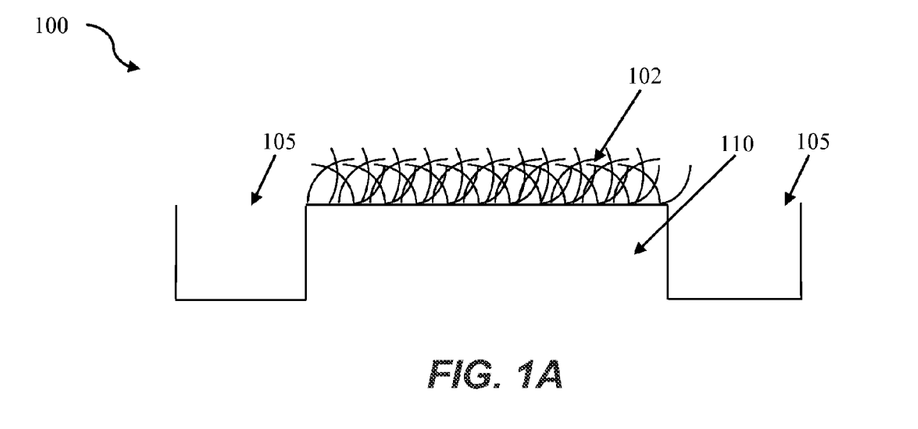
FIG. 1A illustrates an example of a strawberry bed when formed.
Figure 1B:
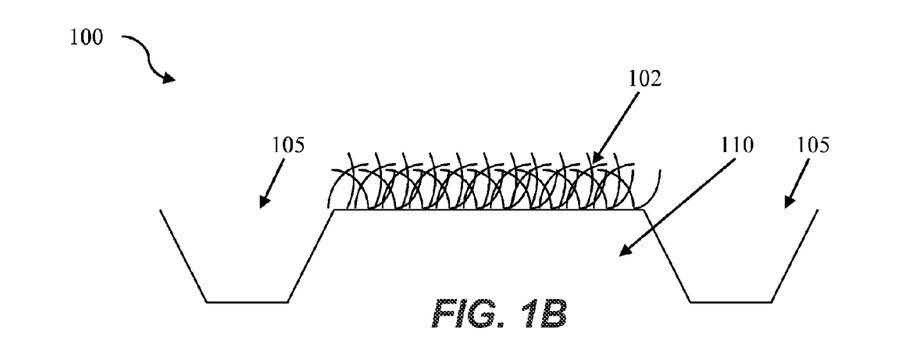
FIG. 1B illustrates a strawberry bed over time.

FIGS. 1A and 1B illustrate an example of a strawberry bed 100. FIG. 1A illustrates an example of a strawberry bed 100 when formed; and FIG. 1B illustrates the strawberry bed 100 over time. In at least one implementation, the strawberry bed 100 can be used for growing strawberry plants 102. In particular, the strawberry beds 100 can be used to raise the strawberry plants 102 so workers need not bend over as far and also to ensure that, as strawberries grow, water can be applied and the strawberry grower or workers can move among the strawberries without damaging the plants 102 or fruit. One of skill in the art will appreciate that while strawberry plants 102 and strawberry harvesting are treated as exemplary, the embodiments described herein can be used for growing and harvesting any ground level plants and fruits.

FIGS. 1A and 1B show that the strawberry bed 100) with strawberry plants 102 includes a furrow 105. In at least one implementation, the furrow 105 can include an area where no strawberry plants 102 are allowed to grow. In particular, the floor of the furrow 105 can remain clear to allow for movement among the strawberry plants 102. For example, water can be added to the furrow 105, which moves through the furrow 105 in order to water the strawberry plants 102. Additionally or alternatively, a person or machine can be moved through the strawberry bed 100 with all parts in contact with the ground located on the floor of furrow 105. The parts in contact with the ground will, therefore, not damage the strawberry plants 102 or the fruit growing thereon.

FIGS. 1A and 1B further show that the strawberry bed 100 can include a row 110. In at least one implementation, the row 110 can include a raised area where the strawberry plants 102 are located. In particular, the raised area is protected because machines and people move through the furrow 105

In at least one implementation, the dimensions of the width between troughs 105 and the width of the row 110 can be standardized. Standardization may have any basis, including production efficiency, state or local regulations, an agreement between farmers, a standard size of farm machinery or any other basis. For example, standardization can include a trough 18 inches wide and a row 48 inches wide. I.e., the distance between adjacent furrows 105 can be 66 inches. One of skill in the art will appreciate that after creation of the furrow 105 and the row 110, erosion will cause the sides of the furrow 105 to become slanted rather than vertical as shown in FIG. 1B.

Figure 2A:
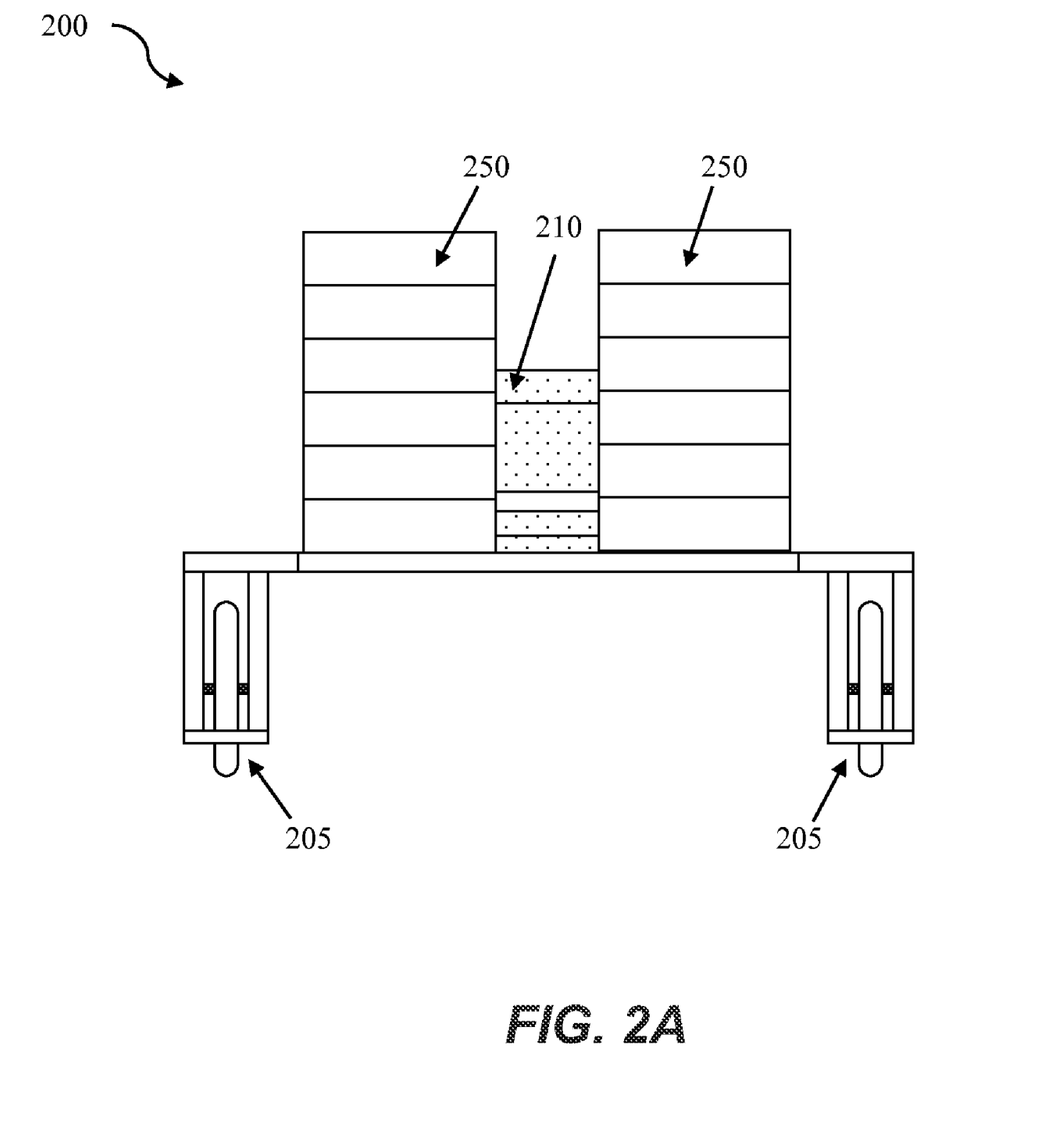
FIG. 2A illustrates a front view of a strawberry picking cart.
Figure 2B:
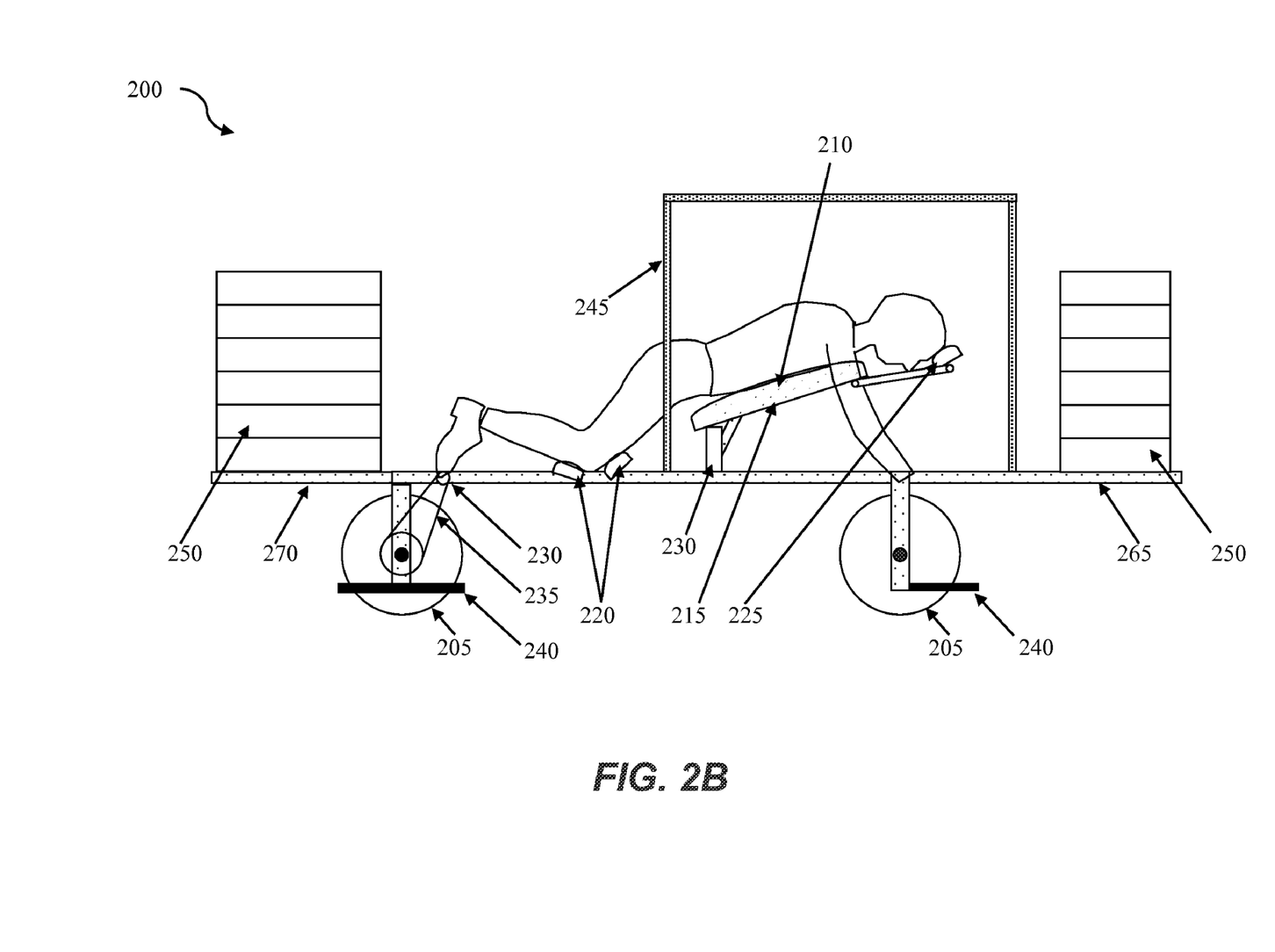
FIG. 2B illustrates a side view of the strawberry picking cart.
Figure 2C:
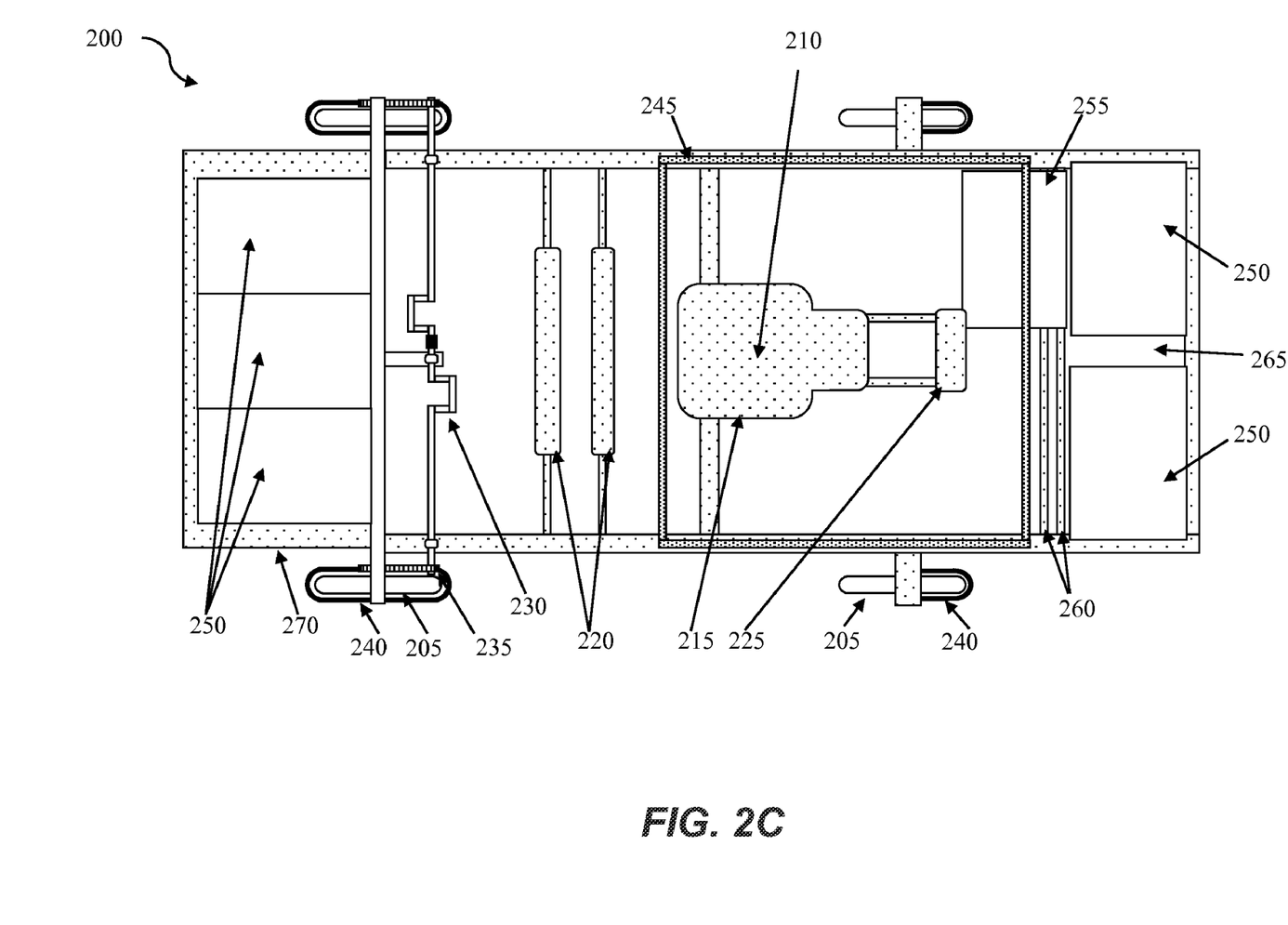
FIG. 2C illustrates a top view of the strawberry picking cart.

FIGS. 2A, 2B and 2C illustrate an example of a strawberry picking cart 200. FIG. 2A illustrates a front view of the strawberry picking cart 200; FIG. 2B illustrates a side view of the strawberry picking cart 200; and FIG. 2C illustrates a top view of the strawberry picking cart 200. In at least one implementation, the strawberry picking cart 200 can be used to harvest strawberries or other ground growing fruit. In particular, the strawberry picking cart 200 can allow the user to harvest strawberries without being forced to bend over or otherwise strain themselves. Harvesting can continue for long periods of time during a harvest day; therefore, reducing the strain on the user can allow for a more productive day of harvesting and reduce time lost to allowing the worker to recover.

FIGS. 2A, 2B and 2C show that the strawberry picking cart 200 can include one or more wheels 205. In at least one implementation, the wheels 205 can allow the strawberry picking cart 200 to move through strawberry beds. For example, if the centers of adjacent furrows are 66 inches apart, the wheels 205 can be spaced 66 inches apart side to side. Spacing the wheels 205 side to side the same distance as the space between furrows can ensure that as the strawberry picking cart 200 moves through a strawberry bed, the wheels 205 remain in the furrows rather than damaging the strawberry plants.

FIGS. 2A, 2B and 2C also show that the strawberry picking cart 100 can include a cushion 210. In at least one implementation, the cushion 210 can support a user while in the strawberry picking cart 200. In particular, the cushion 210 can allow a user to remain in the strawberry picking cart 200 without needing to support his/her body in a comfortable position, which reduces the strain on the user's body. For example, the cushion 210 can allow the user to lie in a prone position; i.e., a face-down position that is substantially horizontal.

FIGS. 2A, 2B and 2C show that the cushion 210 can include a chest cushion 215. In at least one implementation, the chest cushion 215 can include a pad on which the user can support his/her chest and/or stomach. I.e., the chest cushion 215 can support the trunk of the user's body. Additionally or alternatively, the chest cushion 210 can allow a high range of movement even while supporting the user's weight, as described below.

FIGS. 2A, 2B and 2C also show that the cushion 210 can include one or more knee cushions 220. In at least one implementation, the one or more knee cushions 220 can support the user's knees while harvesting strawberries. Additionally or alternatively, the one or more knee cushions 220 can allow the user to push with his/her legs in order to move the cushion 210 laterally, as described below. Additionally or alternatively, the one or more knee cushions 220 can allow the user to move the strawberry picking cart 200, as described below.

FIGS. 2A, 2B and 2C further show that the cushion 210 can include a head rest 225. In at least one implementation, the user can rest his/her head on the head rest 225. In particular, the head rest 225 can work with the chest cushion 215 to prevent neck and back strain to the user. Additionally or alternatively, the head rest 225 can allow the user to continually observe the strawberry plants in order to look for pickable fruit.

FIGS. 2A, 2B and 2C also show that that the strawberry picking cart 200 can include a support 230. In at least one implementation, the support 230 can support the weight of the user while on the cushion 210. Additionally or alternatively, the support 230 can allow for movement of the user while using the strawberry picking cart, as described below.

FIGS. 2A, 2B and 2C further show that the strawberry picking cart 200 can include pedals 230. In at least one implementation, the pedals 230 can allow the user to move the strawberry picking cart 200 as needed. For example, the user can turn the pedals to move the strawberry picking cart 200. The cushion 210 allows the user's feet to naturally be near the pedals 230 such that the user need not strain to reach the pedals 230

In at least one implementation, the cushion 210 can be adjustable. For example, the chest cushion 215, the knee cushions 220, the head rest 225 and the pedal 230 can be adjustable relative to one another. For example, the chest cushion 210 can be moved toward the front of the strawberry picking cart 200 for a taller user. Additionally or alternatively, the cushion 210 and the pedals 230 can be vertically adjustable.

FIGS. 2A, 2B and 2C also show that the pedals 230 can be connected to the wheels 205 via chains 235 or some other mechanism. In at least one implementation, the chain 235 can transfer the rotational motion of the pedals 230 to rotational motion of the wheels 205. In particular, the chains 235 can allow a single rotation of the pedals 230 to translate into a pre-determined amount of rotation in the wheels 205. The ratio can be adjusted as necessary to produce the desired forward motion of the strawberry picking cart 200.

FIGS. 2A, 2B and 2C further show that the strawberry picking cart 200 can include a wheel guide 240. In at least one implementation, the wheel guide 240 can help keep the strawberry picking cart 200 within the furrows when working in a strawberry bed. In particular, the wheel guide 240 can abut against the sides of the furrows to keep the wheels in the furrow; therefore, the strawberry picking cart will naturally position itself in the furrows, as described below.

FIGS. 2A, 2B and 2C also show the strawberry picking cart 200 can include a shade frame 245. In at least one implementation, the shade frame 245 is configured to receive a shade. The shade can be attached to the shade frame 245 to protect the user from the elements. For example, the shade frame 245 can receive a screen or mesh to protect the user from insects. Additionally or alternatively, the shade frame 245 can receive a tarp to protect the user from rain.

FIGS. 2A, 2B and 2C further show that the strawberry picking cart 200 can include one or more boxes 250. In at least one implementation, the one or more boxes 250 can be configured to hold the picked strawberries. The one or more boxes 250 can stack on one another for stability. Additionally or alternatively, the one or more boxes 250 can be moved into any desired position on the strawberry picking cart 200 to be filled by the user or stored for transport to a collection point.

FIGS. 2A, 2B and 2C also show that the strawberry picking cart 200 can include a platform 255. In a least one implementation, a box 250 can be placed on the platform 255. In this position, the user can easily place fruit within the box 250, making the placement of fruit in the box 250 quicker and more convenient, as the distance needed to place the picked fruit is minimized.

FIGS. 2A, 2B and 2C further show that the strawberry picking cart 200 can include one or more rails 260. In at least one implementation, the one or more rails 260 can be used to move the platform 255 laterally, as needed. In particular, the one or more rails 260 can allow the user to position the platform 255, and a box 250 located thereon if present, into the most convenient position for placing the fruit, as described below.

FIGS. 2A, 2B and 2C also show that the strawberry picking cart 200 can include a front platform 265. In at least one implementation, the front platform 265 can be used to store boxes 250 in a manner that allows the user to easily access empty boxes 250 and recently filled boxes 250, as described below.

FIGS. 2A, 2B and 2C also show that the strawberry picking cart 200 can include a rear platform 270. In at least one implementation, rear platform 270 can increase the capacity of the strawberry picking cart 200 and, consequently the amount of fruit that can be harvested between trips to the collection point. For example, the one or more additional platforms 270 can allow the user to transport more boxes 250 in each trip.

Figure 3A:
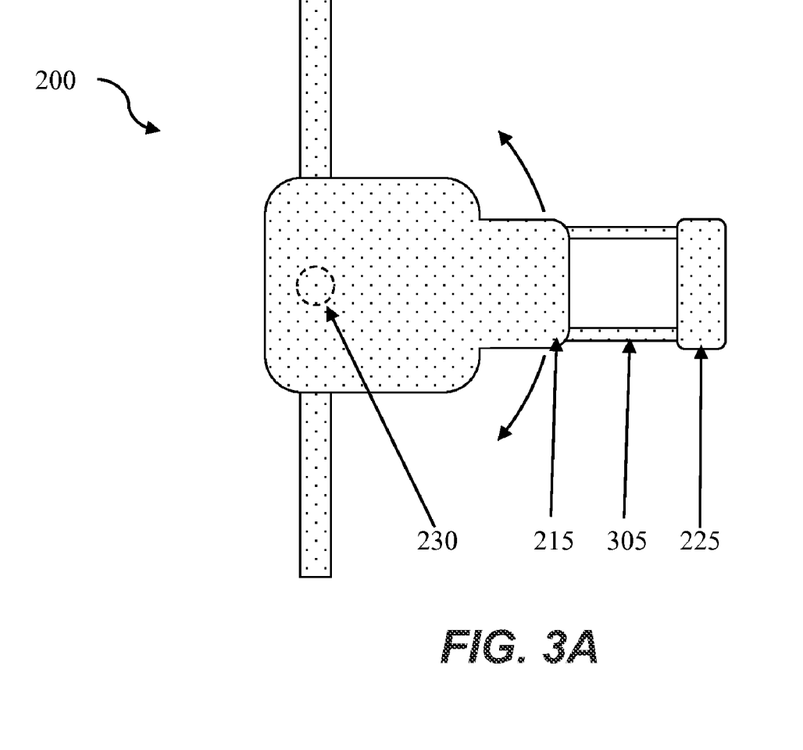
FIG. 3A illustrates a top view of a cushion.
Figure 3B:
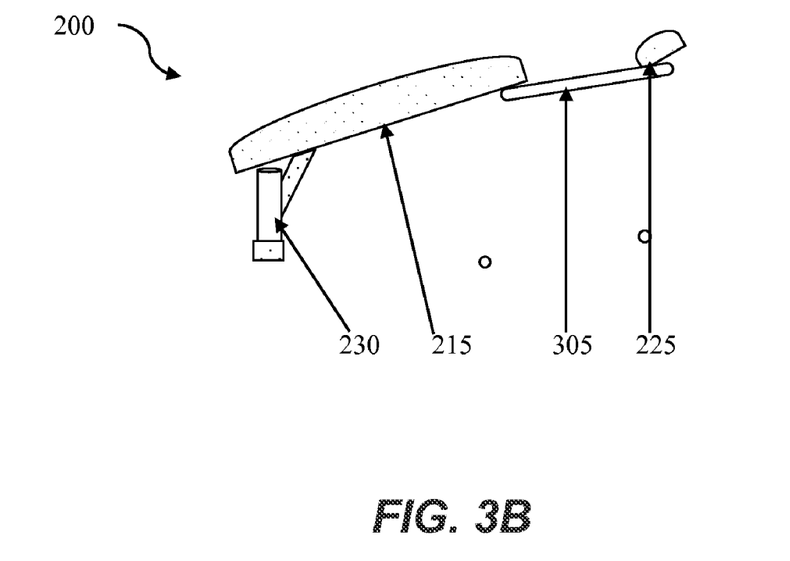
FIG. 3B illustrates a side view of the cushion.

FIGS. 3A and 3B illustrate an example of a cushion 210. FIG. 3A illustrates a top view of the cushion 210; and FIG. 3B illustrates a side view of the cushion 210. In at least one implementation, the cushion 210 can be used to support a user while harvesting strawberries. One of skill in the art will appreciate that the cushion 210 can be used with the strawberry picking cart 200 of FIG. 2; however, the cushion 210 can be used with a strawberry picking cart other than the strawberry picking cart 200 of FIG. 2.

FIGS. 3A and 3B show that the cushion 210 can be moved laterally (shown by the curved arrows in FIG. 3A). In particular, the chest cushion 215 can rotate about the support 230. I.e., the connection between the support 230 and the chest cushion 215 can allow for rotation of the chest cushion 215 relative to the support 230. In at least one implementation, this can allow a user to reach the entire width of the planting bed under the strawberry picking cart for harvesting strawberries.

FIGS. 3A and 3B also show that the cushion 210 can include one or more connectors 305. In at least one implementation, the one or more connectors 305 can allow the head rest 225 to attach to the chest cushion 215. I.e., any movement about the support 230 of the chest cushion 215 can also move the head rest 225. Additionally or alternatively, the one or more connectors 305 can be adjustable so that the user can adjust the position of the head rest 225 relative to the chest cushion 215.

Figure 4A:
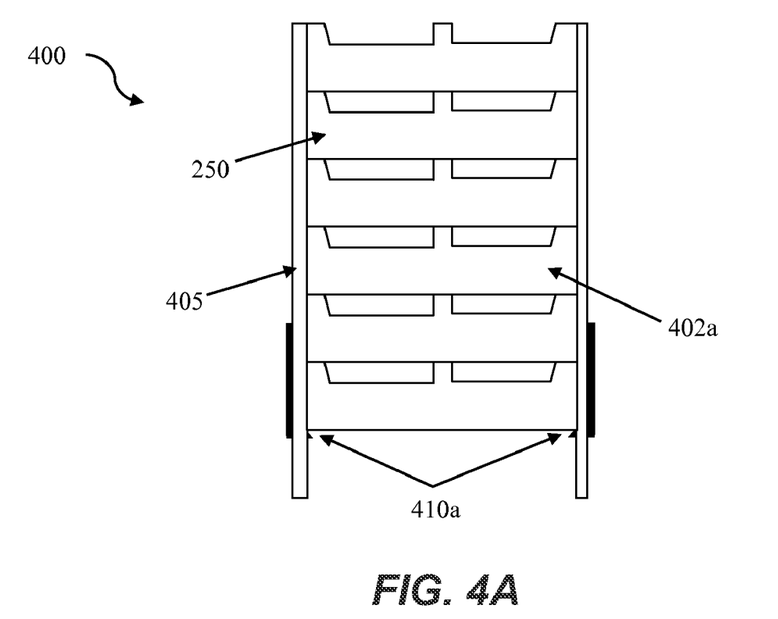
FIG. 4A illustrates an example of a system for positioning empty boxes.
Figure 4B:
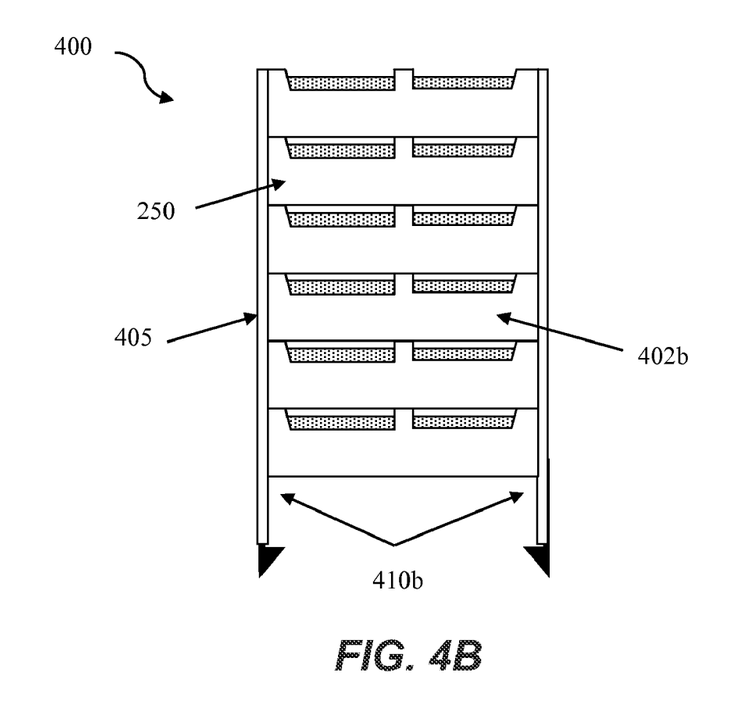
FIG. 4B illustrates an example of a system for positioning full boxes.

FIGS. 4A and 4B illustrate an example of a system 400 for positioning boxes 250 in a strawberry picking cart. FIG. 4A illustrates an example of a system 400 for positioning empty boxes 250; and FIG. 4B illustrates an example of a system 400 for positioning full boxes 250. In at least one implementation, the system 400 can allow the user to quickly move boxes 250 in and out of the position in which boxes 250 are filled. In particular, the system 400 can allow a user to place a full box 250 in a stack of full boxes 402b and take an empty box 250 from a stack of empty boxes 402a (collectively the stack of full boxes 402b and the stack of empty boxes 402a are "stack of boxes 402") to place strawberries within the empty box 250.

FIGS. 4A and 4B show that the system 100 includes a guide 405. In at least one implementation, the guide 405 can cover a portion of the front, side and back of each stack in order to ensure that the box 250 moves in a vertical direction without substantial lateral movement. The guide 405 can be made of any material of sufficient strength to support the stack of boxes 250. For example, the guide 405 can be made of metal, wood, plastic or any other suitable material.

FIGS. 4A and 4B show that the system 100 can also include a spring-loaded hook 410a for supporting the stack of empty boxes 402a and a spring-loaded hook 410b (collectively "spring-loaded hooks 410") for supporting the stack of full boxes 402b. In at least one implementation, the spring-loaded hooks 410 are configured to support the bottom of the box 250. In particular, the spring-loaded hooks 410 can include a portion which is intended to go under the edge of the box 250. Boxes 250 can be stacked on one another while allowing a user to access additional boxes 250 as needed. The spring-loaded hooks 410 can be configured to hold the box 250 on the edge in order to support the box 250.

In at least one implementation, the spring-loaded hook 410a can include an inclined surface at the top of the spring-loaded hook 410a. The inclined surface can translate a downward force on the bottom box 250 in the stack of empty boxes 402a into an outward force on the spring-loaded hook 410a. Sufficient force can, therefore, allow the bottom box 250 to be removed from the stack of empty boxes 410a, as described below. In contrast, the spring-loaded hook 410b can include an inclined surface at the bottom of the spring-loaded hook 410b. The inclined surface can translate an upward force on a box 250 below the stack of full boxes 402b into an outward force on the spring-loaded hook 410b. Sufficient force can, therefore, allow the box 250 to the added to the stack of full boxes 402b, as described below.

In at least one implementation, the spring-loaded hooks 410 can provide an upward force on the boxes 250. In particular, the spring-loaded hooks 410 can support the weight of the bottom box 250 such that the bottom box 250 is lifted vertically. Accordingly, the stack of boxes 250 can be lifted off a platform or other surface. The stack of boxes 250 can be held in a vertical position by the guide 405 such that the stack does not tip when the stack is lifted.

Fox example, as a box 250 is raised into the bottom position in the stack of full boxes, the upward movement of the box 250 moves the spring-loaded hooks 410b outward, due to the inclined surface at the bottom of the spring-loaded hooks 410b. During the lifting, the spring-loaded hooks 410b will move outward sufficiently to no longer suspend any box or boxes previously suspended by the spring-loaded hooks 410b, and the weight of any box 250 or boxes then falls upon the bottom box 250 being moved upward. Continued lifting raises the box 250 until it is raised above the horizontal portion of the spring-loaded hooks 410b. At that time the hooks 410b return to the inward position, suspending the newly placed box 250 as well as any other box 250 or boxes above the box bottom 250.

Figure 5:
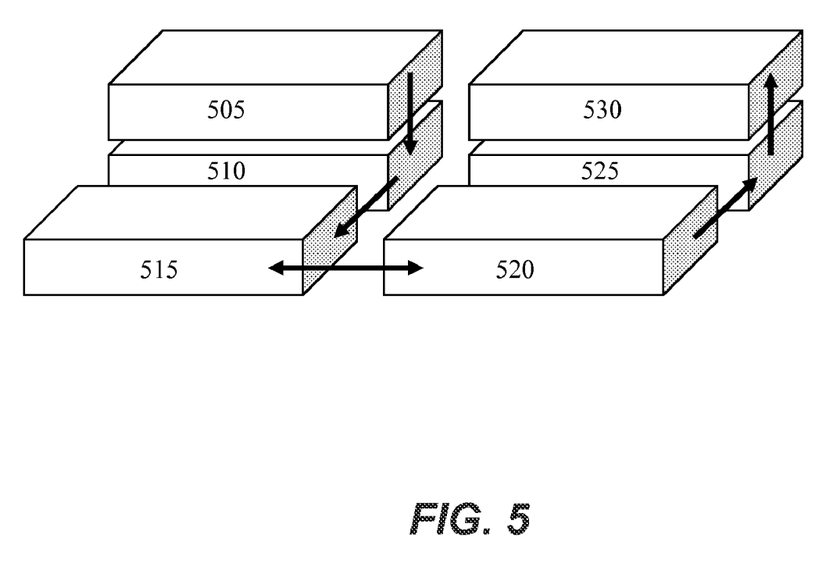
FIG. 5 illustrates the movement of a box as it is filled with strawberries.

FIG. 5 illustrates the movement of a box 250 as it is filled with strawberries. In at least one implementation, the movement of the box 250 can allow the boxes 250 to be filled quickly and efficiently. I.e., the user can easily move a full box 250 into the stack of full boxes 402b and replace it quickly with an empty box 250 from a stack of empty boxes 402a. One of skill in the art will appreciate that the movement can be achieved using the system 400 of FIGS. 4A and 4B and the strawberry picking cart 200 of FIG. 2; however the movement can be achieved using a system other than the system 400 of FIGS. 4A and 4B and a strawberry picking cart other than the strawberry picking cart 200 of FIG. 2.

FIG. 5 shows that the box 250 starts in position 505 at the bottom of a stack of empty boxes. In a least one implementation, in position 505 the box 250 is suspended above some surface. For example, the stack can be suspended using spring-loaded hook 410a of FIG. 4A. I.e., in the first position 505 the box 250 is suspended, such that a separate box 250 can fit beneath the box 250 in position 505.

FIG. 5 also shows that the box 250 is moved downward from the first position 505 to a second position 510. In a least one implementation, the box 250 is moved from the bottom of the stack of empty boxes 402a suspended by spring—loaded hooks 410a into the second position 510, no longer suspended by hooks 410a. I.e., the second position 510 can be below the remainder of boxes 250 in the stack of empty boxes 402a which continue to be suspended by hooks 410a.

FIG. 5 further shows that the box 250 can be moved towards the rear of the strawberry picking cart from the second position 510 to a third position 515. In at least one implementation, strawberries can be placed in the box 250 at the third position 515. I.e., when the box 250 is in the third position 515 the top of the box 250 is open and unobstructed and strawberries can be placed therein.

FIG. 5 also shows that box 250 can be moved sideways from the third position 515 to a fourth position 520. In at least one implementation, moving the box 250 sideways can allow for the user to add strawberries to the box 250 more conveniently. I.e., the box 250 can be moved between positions 515 and 520 to the position which is most convenient for picking. Additionally or alternatively, the filled box 250 can be moved in order to be placed in a stack of full boxes 250, as described below. In at least one implementation, the box 250 can be moved from the third position 515 to the fourth position 520 using a platform that is positioned on rails, as described below.

FIG. 5 further shows that the box 250 can be moved towards the front of the cart from the fourth position 520 to a fifth position 525. In at least one implementation, the fifth position 525 can be directly below a second stack 402b of boxes 250. The second stack of boxes 250 can include boxes that have been previously filled with strawberries.

FIG. 5 also shows that the box 250 can be moved upwards from the fifth position 525 to a sixth position 530. In at least one implementation, the second stack of boxes 250 can be suspended above some surface, as described above. The box 250 can be lifted upward using a lift, as described below.

Figure 6A:
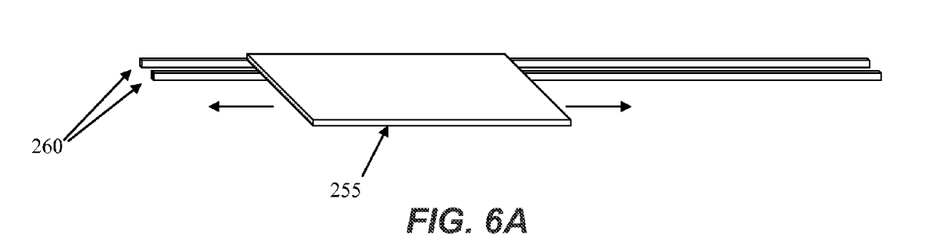
FIG. 6A illustrates a top perspective view of a platform.
Figure 6B:
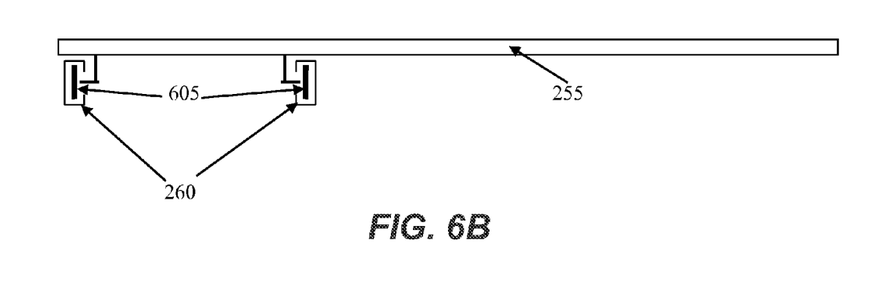
FIG. 6B illustrates a side view of the platform.

FIGS. 6A and 6B illustrate an example of a platform 255. FIG. 6A illustrates a top perspective view of the platform 255; and FIG. 6B illustrates a side view of the platform 255. In at least one implementation, the platform 255 can be used to move a box as needed by the user. For example, the platform can move a box forward or back or both from the third position 515 to the fourth position 520 of FIG. 5.

FIGS. 6A and 6B show what the platform 255 can move along rails 260. In at least one implementation, the rails 260 support the weight of the platform 255 and anything resting thereon. In particular, the rails 260 can be attached to a strawberry picking cart, such as the strawberry picking cart 200 of FIG. 2, for supporting a box or other materials. Additionally or alternatively, the rails 260 can allow the platform 255 to be moved laterally as needed for most efficient picking.

FIGS. 6A and 6B further show that the platform 255 can include one or more wheels 605 for moving the platform 255 along the rails 260. In particular, the rails 260 can include a cavity. The one or more wheels 605 can be positioned and secured within the cavity in the rails 260 such that the one or more wheels 605 are allowed to move along the rails 260 but are not allowed to be freed from the rails 260. This can ensure that the platform 255 remains supported by the rails 260.

Figure 7A:
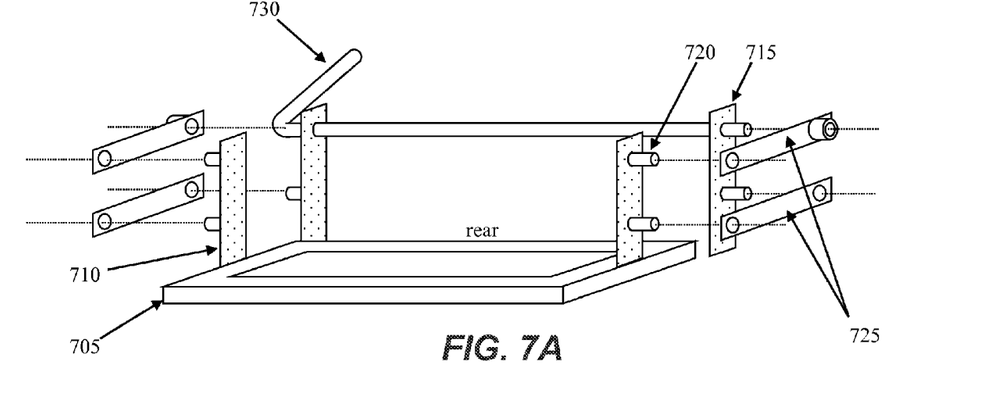
FIG. 7A illustrates an exploded view of a lift system.
Figure 7B:
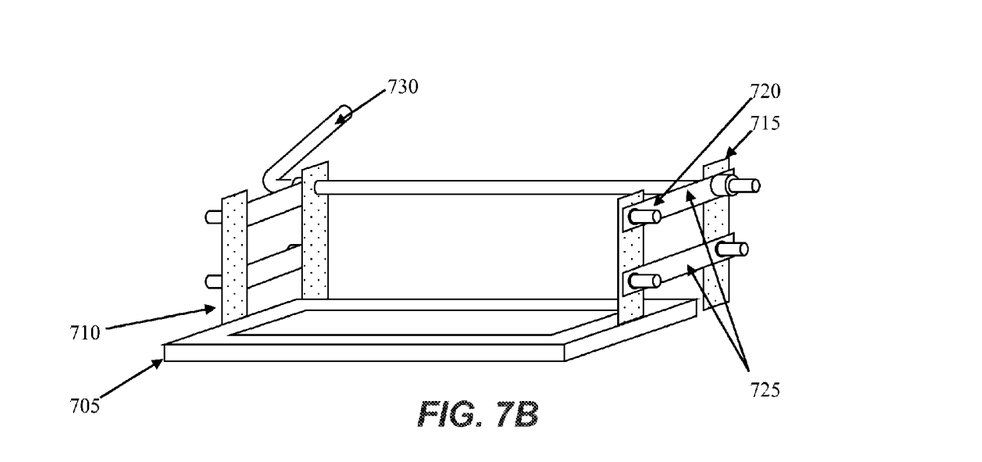
FIG. 7B illustrates a view of the lift system in a lowered position.
Figure 7C:
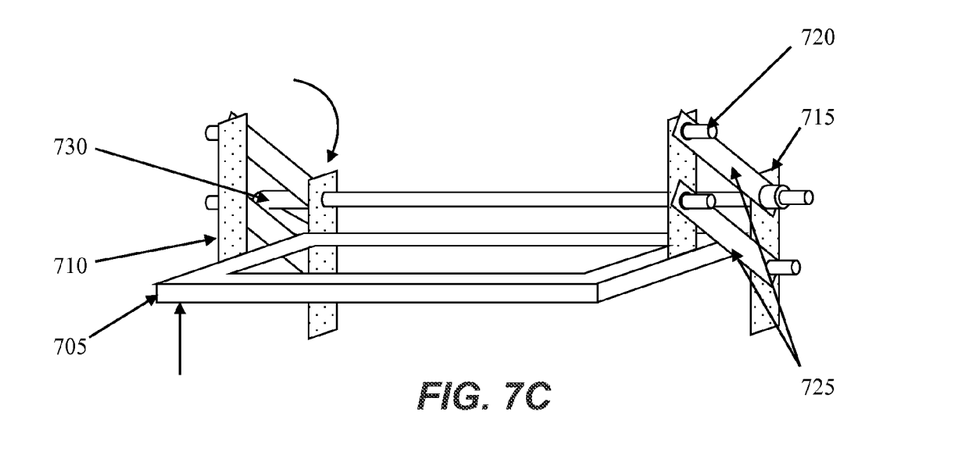
FIG. 7C illustrates a view of the lift system in a raised position.

FIGS. 7A, 7B and 7C illustrate an example of a lift system 700. FIG. 7A illustrates an exploded view of the lift system 700; FIG. 7B illustrates a view of the lift system 700 in a lowered position; and FIG. 7C illustrates a view of the lift system 700 in a raised position. In a least one implementation, the lift system 700 can be used to raise a full box of strawberries. For example, the lift system 700 can be used to raise a box from the fifth position 525 to the sixth position 530 of FIG. 5.

FIGS. 7A, 7B and 7C show that the lift system 700 includes a platform 705. In at least one implementation, the platform 705 can be used to support a box. For example, the outside edge of the platform 705 can be solid and the interior can be removed. By removing the interior of the platform 705, the lift system 700 can lift without extra weight. In particular, the edge of the platform 705 can support the box while the interior, which is not required to support the box, can be removed.

FIGS. 7A, 7B and 7C also show that the lift system 700 includes a first vertical post 710 attached to the platform 705. In at least one implementation, as force is applied to the first vertical post 710, the force is transmitted to the platform 705. I.e., as the vertical post 710 is lowered or raised, the platform 705 is likewise lowered or raised respectively.

FIGS. 7A, 7B and 7C further show that the lift system 700 can include a second vertical post 715. In at least one implementation, the second vertical post 715 can be attached to an external object. In particular, the second vertical port 715 can be attached to a strawberry picking cart, relative to which the platform 705 will be moving.

FIGS. 7A, 7B and 7C also show that the first vertical post 710 and the second vertical post 715 can include one or more pins 720. In at least one implementation, the one or more pins 720 allow for an external object to connect the first vertical post 710 and the second vertical post 715, as described below.

FIGS. 7A, 7B and 7C further show that the lift system 700 can include one or more arms 725. In at least one implementation, the one or more arms 725 can connect the first vertical post 710 to the second vertical post 715. In particular, the one or more arms 725 can be used to translate rotational force on the one or more arms 725 to vertical force on the first vertical post 710. I.e., rotation of the one or more arms 725 will displace the first vertical post 710 relative the second vertical post 715.

FIGS. 7A, 7B and 7C also show that the lift system 700 can include a lever 730. In at least one implementation, the lever 730 can be used to lift and lower the platform 705. In particular, the lever 730 can provide rotational force to the one or more arms 725, which is translated to vertical motion of the first vertical post 710, and thus the platform 705.

Figure 8A:
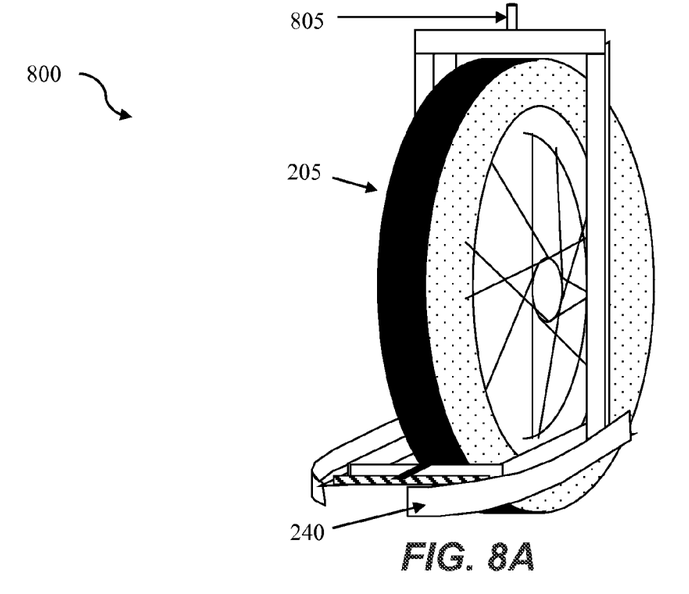
FIG. 8A illustrates a side perspective view of the steering mechanism.
Figure 8B:
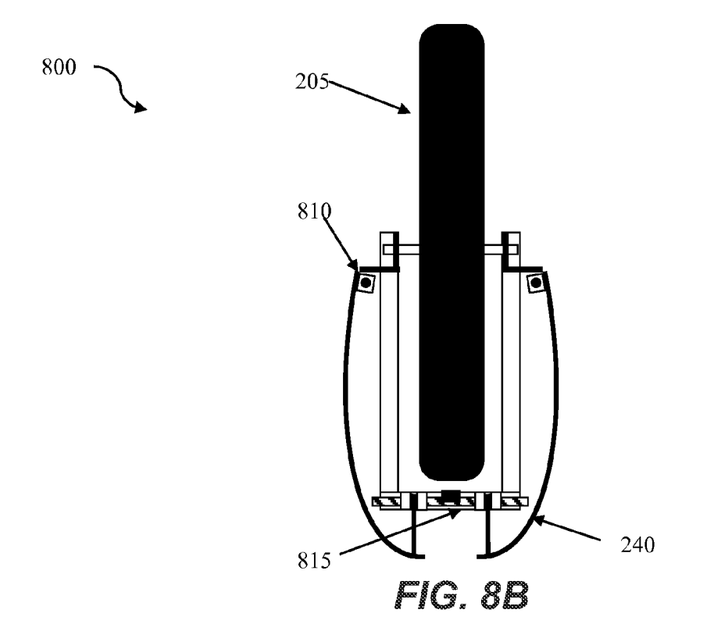
FIG. 8B illustrates a top view of the steering mechanism.

FIGS. 8A and 8B illustrate a steering mechanism 800. FIG. 8A illustrates a side perspective view of the steering mechanism 800; and FIG. 8B illustrates a top view of the steering mechanism 800. In at least one implementation, the steering mechanism 800 will passively steer a strawberry picking cart, such as the strawberry picking cart 200 of FIG. 2, without requiring any effort on the part of the user for such steering. Additionally or alternatively, the steering mechanism 800 can ensure that the wheels 205 of the strawberry picking cart stay within furrows 105 when working in a strawberry bed FIGS. 8A and 8B show that the steering mechanism 800 includes an axis 805. In at least one implementation, the axis 805 can allow a change in the orientation of the wheels 205 relative to the strawberry picking cart. In particular, the wheels 205 can turn about the axis 805 relative to the strawberry picking cart, which will reorient the strawberry picking cart, passively causing it to stay within the furrow 105 as the cart advances along the length of the planting bed 100.

FIGS. 8A and 8B also show that the steering mechanism further includes a wheel guide 240. In at least one implementation, the wheel guide 240 can help keep the strawberry picking cart 200 within the furrows when working in a strawberry bed. In particular, the wheel guide 240 can abut against the sides of the furrows to keep the wheels 205 in the furrow 105; therefore, the strawberry picking cart will naturally position itself in the furrows without any attention or expenditure of work on the part of the user.

FIGS. 8A and 8B further show that the wheel guide 240 can include a hinge 810. In at least one implementation, the hinge 810 can be used to move the sides of the wheel guide 240 relative to the wheel. In particular, the hinge 810 can allow the sides of the wheel guide 240 to expand or contract.

FIGS. 8A and 8B further show that the wheel guide 240 can include an adjustment mechanism 815. In at least one implementation, the adjustment mechanism 815 can allow the width of the steering guide 240 to be adjusted. In particular, the adjustment mechanism 815 can allow a user to make the wheel guide 240 to be expanded or contracted as needed to allow the wheel guide 240 to operate as required within a furrow 105.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for gathering strawberries, the system comprising:
   a strawberry picking cart, wherein the strawberry picking cart includes:
      a cushion, wherein the cushion is configured to allow the user to lie in a prone position;
      one or more wheels, wherein the one or more wheels are configured to support the weight of the strawberry picking cart;

a steering mechanism with passive alignment to maintain the wheels of the cart within the field furrows; and
a stacking mechanism, wherein the stacking mechanism includes:
a spring-loaded hook, wherein the spring-loaded hook is configured to support a stack of full strawberry boxes;
a platform, wherein the platform is configured to support a bottom strawberry box; and
a lifting mechanism, wherein the lifting mechanism is configured to:
lift the platform such that the bottom strawberry box is positioned below the stack of full strawberry boxes;
remove the spring-loaded hook from the stack of full strawberry boxes; and
raise the bottom strawberry box until the spring-loaded hook supports the bottom strawberry box.

2. The system of claim 1, wherein the cushion includes a chest cushion, wherein the chest cushion is configured to support the chest of the user.

3. The system of claim 1, wherein the cushion includes a head rest, wherein the head rest is configured to support the head of the user.

4. The system of claim 1, wherein the cushion includes a knee pad, wherein the knee pad is configured to support the knees of the user.

5. The system of claim 1, wherein the strawberry picking cart further includes a shade frame, wherein the shade frame is configured to protect the user from the elements.

6. A system for gathering strawberries, the system comprising:
a strawberry picking cart, wherein the strawberry picking cart includes:
a cushion, wherein the cushion is configured to allow the user to lie in a prone position;
two front wheels, wherein each front wheel is connected to an axle on the strawberry picking cart;
two rear wheels, wherein each rear wheel is connected to an axle on the strawberry picking cart;
wherein the front wheel axles and the rear wheel axles are configured to support the weight of the strawberry picking cart; and
one or more pedals, wherein the user is able to use the one or more pedals to rotate the rear wheels;
a movable platform, wherein the movable platform is configured to support a strawberry box; and
a stacking mechanism, wherein stacking mechanism includes:
a spring-loaded hook, wherein the spring-loaded hook is configured to support a stack of full strawberry boxes;
a platform, wherein the platform is configured to support a bottom strawberry box; and
a lifting mechanism, wherein the lifting mechanism is configured to:
lift the platform such that the bottom strawberry box is positioned below the stack of full strawberry boxes;
move the spring-loaded hook from under the stack of full strawberry boxes; and
raise the bottom strawberry box until the spring-loaded hook supports the bottom strawberry box.

7. The system of claim 6, wherein the distance between front wheels is 66 inches.

8. The system of claim 7, wherein the distance between rear wheels is 66 inches.

9. The system of claim 6, wherein the movable platform includes one or more rails to support the movable platform.

10. The system of claim 9, wherein the movable platform includes one or more wheels configured to move the movable platform along the one or more rails.

\* \* \* \* \*